Aug. 22, 1950 M. S. BISKIND 2,520,028
MAXIMUM INDICATING INSTRUMENT
Filed Jan. 8, 1947

INVENTOR
MORTON S. BISKIND
BY Rummler, Rummler & Davis
ATTORNEYS

Patented Aug. 22, 1950

2,520,028

UNITED STATES PATENT OFFICE 2,520,028

MAXIMUM INDICATING INSTRUMENT

Morton S. Biskind, New York, N. Y.

Application January 8, 1947, Serial No. 720,880

15 Claims. (Cl. 116—131)

This invention relates to speedometers, tachometers, and other dial-and-needle type of indicating instruments; and particularly to such devices having means to visually indicate when the instrument needle reaches a predetermined position on the dial scale.

The main objects of this invention are to provide an improved indicating instrument having a visual alarm operative when a predetermined limit or maximum position of indication has been reached; to provide such a device of simplified construction wherein the point of maximum indication can be adjusted quickly and easily; to provide such a device wherein a single adjustment means serves both to adjust the position for maximum indication and as a means for visual alarm; to provide a maximum position indicating instrument wherein physical connection between the instrument indicator and the alarm means is obviated; and to provide an improved, adjustable maximum indicating instrument, of the dial-and-needle type, of simplified construction and low manufacturing cost.

A specific embodiment of this invention is shown in the accompanying drawings, in which.

Figure 1:
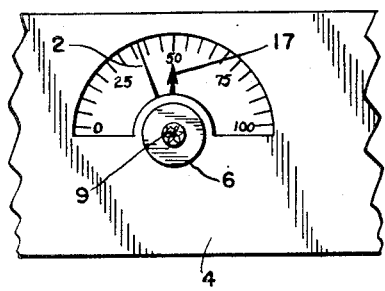
Figure 1 is a face view of a maximum indicating dial-and-needle type instrument as it might appear when mounted on an instrument panel.

In the form shown in the drawings, the invention is embodied in a speedometer or tachometer comprising a dial 1 having an arcuate scale on its face and an indicator or indicating needle 2 pivotally mounted, at the center of the arcuate scale, on a needle operating shaft 3, which in turn is suitably connected to the needle operating means, not shown, by which the needle is actuated angularly to register in conjunction with the scale on the dial 1 to indicate speed. The face of the instrument is enclosed by means of a suitable cover or casing 4, which may, if desired, be a part of a panel in which the instrument is mounted, and a glass or other suitable transparent means 5 is provided to permit reading of the scale carried on the dial 1.

As shown, the maximum indicating means comprises a knob or operating member 6 rotatably mounted in a bushing 7, secured in the casing or face member 4 so that the knob 6 is substantially concentric with the axis of the needle actuating shaft 3. The knob 6 is preferably hollow to provide a central light transmitting bore 8 which terminates at its forward end in an indicating button or bulls-eye 9 made of glass or other suitable transparent material, preferably colored to attract attention. A bracket or arm 10 is suitably secured on the inner end of the knob 6 and extends radially or laterally downward therefrom to a point beyond the lower edge of the dial 1 where the arm 10 is turned at right angles and extended rearwardly and transversely of the path of indicator 2 to form a support or carrier 11 for a suitable lamp or bulb 12 which has connections 13 leading to a source of electrical energy.

The lamp or bulb 12 is directed forwardly and a periscope means or light conducting member 14, mounted in the knob 6 and swingable with the arm 10, is provided to transmit light from the lamp 12 to the indicating button or bullseye 9 at the center of the knob 6. The periscope or light conducting element 14 may be made of any suitable material such as glass or plastic tubing having one leg extending into the bore 8 of the knob 6, whereby the element is held for rotation with the knob 6, and having its outward corners mitered and provided with reflecting mirrors 15. If desired, the mirrors may be omitted and the light conducting member may be merely a rod of light-transmitting material, such as Lucite, appropriately bent or shaped to provide a leg extending into the knob 6, and a suitable light entry end portion or face 16 at its opposite end aligned with the lamp 12.

The arm 10 is also provided with a pointer 17 which extends in the direction opposite the lamp-carrying portion of the arm and a suitable friction stop or detent 18 is provided on the arm to engage with the inner face of the closure plate 4 and hold the arm in the position to which it is set by means of the knob 6. Thus, by turning the knob 6, the bracket and lamp-carrying arm 10, together with the periscope element 14 and the pointer 17, may be swung about the axis of the indicating needle 2, in a path parallel therewith, and set to any desired position relative to the scale on the dial 1.

In the form shown, the needle 2 is provided with a shutter 19 of quadrant shape mounted on an arm 20 which extends from the needle actuating shaft 3 in the direction opposite the needle 2, the shutter 19 extending arcuately from the arm 20 in the direction of rotation of the needle as it moves ascendingly over the scale on the face of the dial 1. The length of the arm 20 is such that the path of the shutter 19 will extend between the lamp 12 and the light entering face 16 of the periscope or light transmitting means 14, thus normally intercepting, or serving as a barrier to, the passage of light from the lamp 12 to the periscope 14. Thus the passage of light from the lamp 12 will be blocked until the needle 2, together with the shutter 19, have been swung arcuately by the shaft 3 to such an extent as to swing the shutter beyond the lamp 12, and the indicating button 9 will not be illuminated until such swinging action of the shutter 19 has occurred.

The shutter 19 has been described as being quadrant shaped, assuming that the range of the scale on the dial 1, from zero to maximum, will include an arc of 180°. Thus, the pointer may be set at any position up to 90° in advance of the needle 2, and, since the shutter-carrying arm 20 is aligned with the needle, and assuming the pointer 17 to be aligned with the lamp-carrying arm 10, the shutter 19 will block the passage of light from the lamp 12 to the indicating button 9 until the needle 2, carrying the shutter 19, has been swung beyond the position of the pointer 17. When the needle 2 passes beyond the position of the pointer 17, the passage for light from the lamp 12, through the periscope 14, will be clear and the indicating button 9 will become illuminated. It will be understood, however, that the length of the shutter will depend upon the desired extent of advance setting of the pointer 17, or the angular relation of the pointer to the arm 10.

By means of the knob 6 the pointer 17 may be set to any position relative to the dial 1 at which an alarm or warning is desired, and the position of the lamp 12 relative to the shutter 19 will be located accordingly so that passage of light from the lamp 12 through the light conducting means or periscope 14 will be blocked until the needle 2, together with the shutter 19, have been swung to or beyond the maximum position to which the pointer 17 has been set.

Figure 2:
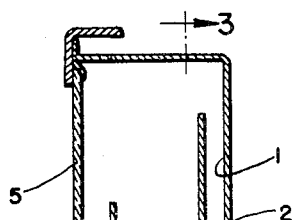
Fig. 2 is a sectional view in elevation showing details of the device as it may be incorporated in a speedometer or tachometer.
Figure 3:
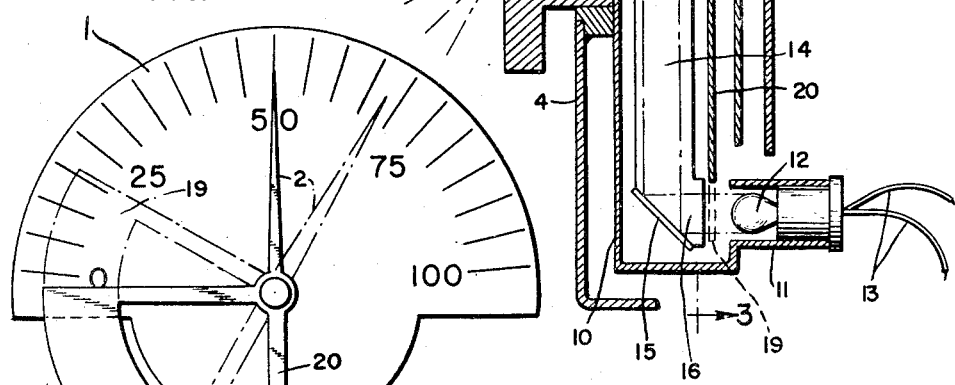
Fig. 3 is a sectional view as taken on line 3—3 of Fig. 2 showing an arrangement of the indicating needle and the manner of controlling the visual alarm device.
Figure 4:
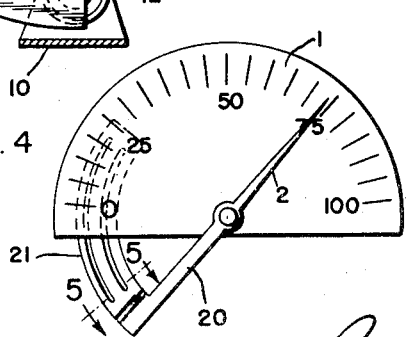
Fig. 4 is a similar view showing a modified arrangement of the means for controlling the visual alarm device.
Figure 5:
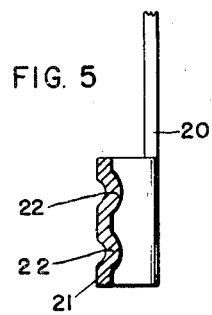
Fig. 5 is a detailed fragmentary sectional view as taken on line 5—5 of Fig. 4.

In the form shown in Figs. 2 and 3, shutter 19 is disposed in the same plane as the needle 2, and will thus swing over the face of the dial 1. In case it is desired that the face of the dial 1 be kept clear at all times, the shutter may be arranged so as to swing behind the dial 1. Such an arrangement is shown in Fig. 4 wherein the shutter 21 is disposed rearward of the plane of the shutter supporting arm 20 and disposed in another plane parallel thereto but behind the plane of the dial 1. In this arrangement, the shutter 21 must be supported entirely from the arm 20 and to stiffen the shutter it may be desirable to provide arcuate stiffening ribs 22 in the shutter surface to prevent warping or twisting of the shutter, as shown in Fig. 5.

While such an arrangement is not shown, it will be understood that the needle 2 and shutter 19 will be suitably counterbalanced on the needle actuating shaft 3 so that the shaft 3 will be in rotational balance for any position of the shutter 19.

The main advantages of this invention reside in the simplicity of the construction wherein light from a laterally disposed light source is transmitted to a centrally disposed button or lens through a path that may be interrupted by a shutter actuated from an axis aligned with the indicating button or lens. Other advantages reside in the arrangement of parts whereby the dial type of instrument need not be materially increased in size, and whereby the invention can be readily incorporated in the construction of dial type instruments without material modification of their usual operative parts. Still further advantages are to be found in the arrangement whereby the maximum indicating means may be quickly adjusted to any desired position along a fixed scale by means of a single control knob which directly adjusts the alarm producing elements to proper relation with an independently controlled needle and shutter.

Although but one specific embodiment of this invention is herein shown and described, it will be understood that details of the construction shown may be altered or omitted without departing from the spirit of this invention as defined by the following claims.

I claim:

1. In a device of the class described comprising a movable indicator, a bracket mounted for shifting movement along a path parallel with the path of said indicator, an operating member on said bracket for shifting the same, a lamp carried on said bracket, said operating member being adapted to transmit light therethrough from said lamp, and means movable with said indicator adapted to interrupt the light path from said lamp to said operating member during a predetermined extent of the movement of said indicator.

2. In a device of the class described comprising a movable indicator, a bracket mounted for shifting movement along a path parallel with the path of said indicator, an operating member on said bracket for shifting the same, said operating member being adapted to transmit light therethrough, a lamp mounted on said bracket and disposed laterally relative to said operating member, means to direct light from said lamp through said operating member, and means movable with said indicator adapted to interrupt the light path from said lamp to the last named means during a predetermined extent of the movement of said indicator.

3. In a device of the class described comprising a movable indicator, a bracket mounted for shifting movement along a path parallel with the path of said indicator, said bracket having a portion extending transversely of the path of said indicator, a lamp mounted on said transversely extending portion, an operating member on said bracket for shifting the position of the same, said operating member being adapted to transmit light therethrough from said lamp, and a shutter on said indicator adapted and disposed to intercept light passing from said lamp to said operating member.

4. In a device of the class described comprising a movable indicator, a bracket mounted for shifting movement along a path parallel with the path of said indicator, said bracket having a portion extending transversely of the path of said indicator, a lamp mounted on said transversely extending portion, an operating member on said bracket for shifting the position of the same, said operating member having means to transmit light therethrough from said lamp, and means movable with said indicator disposed and adapted to intercept light passing from said lamp to said operating member during a predetermined portion of the movement range of said indicator.

5. In a device of the class described comprising a movable indicator, a bracket mounted for shifting movement along a path parallel with the path of said indicator, said bracket having an operating member positioned in front of said indicator and having a laterally disposed portion extending rearwardly transverse the path of said indicator, a lamp mounted on said rearwardly extending bracket portion at the rearward side of the path of said indicator, means on said bracket adapted to transmit light from said lamp to said operating member, and means movable with said indicator disposed to intercept light passing from said lamp to said light transmitting means.

6. In a device of the class described comprising a movable indicator, a bracket mounted for shifting movement along a path parallel with the path of said indicator, said bracket having an operating member positioned in front of said indicator and having a laterally disposed portion extending rearwardly transverse the path of said indicator, a lamp mounted on said rearwardly extending bracket portion at the rearward side of the path of said indicator and directed forwardly therefrom, periscope means extending along said bracket from said operating member to said laterally extending portion and having a light entry face aligned with said lamp, and shutter means movable with said indicator and disposed to pass between said lamp and the light entry face of said periscope means.

7. In a device of the class described comprising a movable indicator, a bracket mounted for shifting movement along a path parallel with the path of said indicator and having an operating member adapted to transmit light therethrough positioned in front of said indicator, said bracket extending laterally from said operating member and terminating in a rearwardly projecting portion extending transversely of the path of said indicator, a lamp mounted on said rearwardly projecting portion behind the path of said indicator, a light transmitting element extending along said bracket and having a leg at one end extending into said operating member and a light entry portion at its opposite end aligned with said lamp, and a shutter means movable with said indicator and disposed between said lamp and the light entry portion of said light transmitting element.

8. In a dial type indicating instrument having an angularly shiftable indicator, a maximum position indicating means comprising an operating member rotatably mounted at the face side of said instrument, said operating member being adapted to transmit light therethrough, an arm fixed to and extending laterally from said operating member, a lamp mounted on said arm, means adapted to direct light from said lamp through said operating member, and means movable with the instrument indicator adapted to intercept the light path from said lamp to said operating member during a predetermined extent of the angular movement of said indicator.

9. In a dial type indicating instrument having an angularly shiftable indicator, a maximum position indicating means comprising an operating member rotatably mounted at the face side of said instrument, said operating member having an axial passage therethrough, an arm fixed to and extending laterally from said operating member, a lamp mounted on said arm, means adapted to direct light from said lamp through the axial passage in said operating member, and means movable with the instrument indicator adapted to intercept the light path from said lamp to said operating member during a predetermined extent of the angular movement of said indicator.

10. In a dial type indicating instrument having an angularly shiftable indicator, a maximum position indicating means comprising an operating member rotatably mounted at the face side of said instrument, said operating member being adapted to transmit light therethrough, an arm fixed to and extending laterally from said operating member, a lamp mounted on said arm, a light conducting member extending along said arm from said operating member and having its light entry end aligned with said lamp, and means movable with the instrument indicator adapted to pass between said lamp and light conducting member during a predetermined extent of the angular movement of said indicator.

11. In a dial type indicating instrument having an angularly shifting indicator, a maximum position indicating means comprising an operating member rotatably mounted at the face side of said instrument and axially aligned with said indicator, said operating member being adapted to transmit light therethrough, an arm fixed on and extending radially from said operating member, a lamp mounted on said arm, means adapted to direct light from said lamp through said operating member, and a shutter movable with said indicator adapted to interrupt passage of light from said lamp to said operating member during a predetermined extent of the angular movement of said indicator.

12. In a dial type indicating instrument having an angularly shifting indicator, a maximum position indicating means comprising an operating member rotatably mounted at the face side of said instrument and axially aligned with said indicator, said operating member being adapted to transmit light therethrough, an arm fixed on and extending radially from said operating member, a lamp mounted on said arm, means adapted to direct light from said lamp through said operating member, a pointer on said operating member arranged to indicate the angular position of said arm, and a shutter movable with said indicator adapted to interrupt the passage of light from said lamp to said operating member during a predetermined extent of the angular movement of said indicator relative to said arm.

13. In an indicating instrument having a dial and an indicator mounted on an axis normal to the dial for rotation relative thereto, a limit-position indicating means comprising an operating knob rotatably mounted at the face side of said dial in axial alignment with said indicator, said knob having an axial passage therethrough, an arm extending radially from the inner end of said knob, a lamp mounted on said arm adjacent its free end, a light transmitting means shiftable with said arm having one end directed into the passage through said knob and having a light entry end aligned with said lamp, and a shutter shiftable with said indicator along a path extending between said lamp and the light entry end of said transmitting means.

14. In an indicating instrument having a dial and an indicator mounted on an axis normal to the dial for rotation relative thereto, a limit-position indicating means comprising an operating knob rotatably mounted at the face side of said dial in axial alignment with said indicator, said knob having an axial passage therethrough, an arm extending radially from the inner end of said knob and having its free end portion projecting rearwardly normal to the plane of said dial, a lamp mounted on the rearward portion of said arm and directed forwardly, a light conducting means extending along said arm and having one end directed into the passage in said knob and the other end directed toward said lamp, and a shutter shiftable with said indicator and normally disposed between said lamp and the adjacent end of said light conducting means.

15. In an indicating instrument having a dial and an indicator mounted on an axis normal to the dial for rotation relative thereto, a limit-position indicating means comprising an operating knob rotatably mounted at the face side of said dial in axial alignment with said indicator, said knob having an axial passage therethrough, an arm extending radially from the inner end of said knob and having its free end portion projecting rearwardly beyond the edge of said dial, a lamp mounted on the rearward portion of said arm and disposed behind said dial, a light conducting means extending along said arm and having one end directed into said passage and its other end directed toward said lamp, and a shutter shiftable with said indicator along a path extending between said lamp and said other end of the light conducting means, said shutter being disposed in a plane behind the plane of said dial.

MORTON S. BISKIND.

REFERENCES CITED

The following references are of record in the file of this patent:

UNITED STATES PATENTS

| Number | Name | Date |
| --- | --- | --- |
| 2,071,284 | Hyland | Feb. 16, 1937 |
| 2,314,817 | Christensen | Mar. 23, 1943 |
| 2,317,109 | Oxland | Apr. 20, 1943 |
| 2,341,924 | Kruck | Feb. 15, 1944 |